US010761200B1

(12) United States Patent
Eschey et al.

(10) Patent No.: US 10,761,200 B1
(45) Date of Patent: Sep. 1, 2020

(54) METHOD FOR EVALUATING POSITIONING PARAMETERS AND SYSTEM

(71) Applicant: OSRAM GmbH, Munich (DE)

(72) Inventors: Michael Eschey, Wehringen (DE); Helmi Abidi, Munich (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 16/801,202

(22) Filed: Feb. 26, 2020

(30) Foreign Application Priority Data

Feb. 27, 2019 (DK) ................................. 2019 70136

(51) Int. Cl.
| | |
|---|---|
| *G01S 11/06* | (2006.01) |
| *H04W 4/029* | (2018.01) |
| *H04W 64/00* | (2009.01) |
| *G01S 5/02* | (2010.01) |
| *G01S 5/14* | (2006.01) |

(52) U.S. Cl.
CPC .............. *G01S 11/06* (2013.01); *G01S 5/0252* (2013.01); *G01S 5/0257* (2013.01); *G01S 5/14* (2013.01); *H04W 4/029* (2018.02); *H04W 64/003* (2013.01)

(58) Field of Classification Search
CPC .......... G01S 11/06; G01S 5/0252; G01S 5/14; G01S 5/0257; H04W 4/029; H04W 64/003
See application file for complete search history.

(56) References Cited

U.S. PATENT DOCUMENTS

2015/0257014 A1* 9/2015 Ahmed ................. H04W 16/20
370/255

FOREIGN PATENT DOCUMENTS

| CN | 105044662 A | 11/2015 |
|---|---|---|
| CN | 108111966 A | 6/2018 |
| CN | 109068267 A | 12/2018 |
| WO | 2015183998 A1 | 12/2015 |

OTHER PUBLICATIONS

Wikipedia; "k-means clustering"; retrieved on Feb. 26, 2020 from https://en.wikipedia.org/wiki/K-means_clustering; 10 pages.
Wikipedia; "Hierarchical clustering"; retrieved on Feb. 26, 2020 from https://en.wikipedia.org/wiki/Hierarchical_clustering; 5 pages.

(Continued)

*Primary Examiner* — Marisol Figueroa
(74) *Attorney, Agent, or Firm* — Viering, Jentschura & Partner MBB

(57) ABSTRACT

A method for evaluating positioning parameters in a defined area, wherein the defined area is affected by at least three stationary access beam points and over which a grid pattern is laid with at least two grids, each grid having an anchor. An initial vector of positioning parameters is assigned to each anchor and a plurality of RSSI measurements are captured within the defined area by receiving signals from the at least three stationary access beam points. The plurality of RSSI measurement are clustered in a plurality of subsets, wherein the number of subsets corresponds to the number of the at least two grids. Finally, each subset of the plurality of subsets is associated with a respective one of the at least two grids and the initial vector is updated based on the subset of the plurality of subsets associated with the respective one of the at least two grids.

15 Claims, 5 Drawing Sheets

(56) References Cited

OTHER PUBLICATIONS

Wikipedia; "Log-distance path loss model"; retrieved on Feb. 26, 2020 from https://en.wikipedia.org/wiki/Log-distance_path_loss_model; 2 pages.
1st technical examination of related DK patent application PA201970136 dated Jun. 13, 2019, 7 pages, for reference purpose only.

\* cited by examiner

METHOD FOR EVALUATING POSITIONING PARAMETERS AND SYSTEM

The present application claims priority from DK application No. PA201970136 dated 27 Feb. 2019, the disclosure of which is incorporated herein in its entirety by reference.

TECHNICAL FIELD

The present disclosure concerns a method for evaluating positioning parameters in a defined area, particularly in a closed space. The disclosure also addresses a system for evaluating positioning parameters in a defined area, particularly in a closed space.

BACKGROUND

The development of services making use of positioning or locating systems. While outdoor services i.e. in cars and the like make use of the GP System for example, indoor positioning systems are still facing major problems. Most often radio frequency measurements are used to estimate the positioning in response to one or more stationary points. Still, noise in the transmitted or received signals or a changing environment represent challenges, which are not easily overcome.

Various methods and approaches have been developed in recent years such as for example the WO 2015/183998 A1. Therein a method for location transition determination of a mobile device at a venue is described. A location server is thereby determining a grid for survey data including measurements of environment variables at various locations in the venue. The location server can associate each cell with a distribution of measurements of the signals from the environment variable in the cell. The location server can provide a representation of the grid, including the cells and corresponding distributions, to a mobile device for determining a location of the mobile device in the venue.

The WO 2015/183998 A1 and each of the other various methods however having its own field of application with its individual advantages and limitations. Hence, there is still a need for an improved method for estimating the position or location in an indoor environment. In particular, the method should provide an improved robustness for estimating parameters required to determine the positioning.

SUMMARY

The disclosure proposes a combination of two different ways to estimate a positioning in an indoor space together with unsupervised learning to retrieve updated parameters. The latter can be used to determine the positioning much more accurately.

In an aspect, a method for evaluating positioning parameters in a defined space, particularly in an indoor space, is provided. The defined space is affected by at least one, particularly at least three stationary access point. Further, a grid pattern with at least two grids is laid over the defined area, each grid having an anchor. In other words, a grid pattern is provided covering the defined space. The anchor may be the center of each grid, but can also be any other point, particularly within the respective grid. The method includes the step of assigning an initial vector of positioning parameters to each anchor. Then a plurality of RSSI measurements within the defined space using the at least one stationary access beam point is captured and stored. The plurality of RSSI measurements are then clustered into a plurality of subsets. In accordance with the proposed principle, the number of subsets corresponds to the number of the at least two grids. Each subset of the plurality of subsets is associated to a respective one of the at least two grids. For each of the grids the initial vector assigned to the respective anchor of the grid is updated. The update may be based on the vector with the initial positioning parameters and the subset of the plurality of subsets associated with the respective one of the at least two grids.

The proposed method will provide an improved vector having an updated set of positioning parameters, in particular updated path-loss parameters. These updated parameters are then used for upcoming positioning. In addition, the updated vector becomes the new initial vector for the next iteration. As a result, the proposed method iteratively updates the positioning parameter set for each anchor.

In some instances, the updated positioning parameter set is used to determine a positioning based on respective RSSI measurement and the vector of positioning parameters. The parameter set for example can be forwarded to devices using the set to determine its positioning. By this way, one could push updated path-loss parameters to a plurality of mobile or other devices which use the information to update their respective positioning parameters. This application may be suitable for example in an automated warehouse, in which automated vehicles are finding their way through a slow changing environment. Another application could a be a larger retail shop or the like to inform potential customers about their positioning and distance to certain offerings for example.

In some other aspects, the step of capturing and storing of RSSI measurement may also contain attaching a time stamp to each captured RSSI measurement and/or determining the positioning using the RSSI measurement and the initial vector of positioning parameters. Hence, additional information can be stored as offline information for later processing. Storing the positioning information may be useful to avoid a high computational effort at a later stage, because RSSI measurements are captured over a long period of time with enough time to evaluate the positioning, while doing it at a later stage over a short period, high computational effort may become necessary.

In some aspects, the data needs to be pre-processed prior to the actual clustering. Such pre-processing may include augmenting the plurality of RSSI measurements including a dynamic time warping (DTW) approach using a plurality of neighbouring RSSI measurements to a selected RSSI measurement. Data augmentation with RSSI measurements can include a repetitive approach, in which RSSI measurements are iteratively augmented.

For the clustering an unsupervised learning method can be utilized in some aspects. Such learning method may include a DEC, a deep embedding clustering framework including an auto encoder. The auto-encoder reduces the dimension of the available data to reduce noise within the data set. The RSSI measurement data are transformed by the auto-encoding with a non-linear mapping to a new feature space. In such a feature space including the encoded information, the mapping may become easier and fast using less computational effort. Noise and other artifacts are cancelled out or after training recognised as such by the clustering framework. The encoded information is then fed into an clustering algorithm. The clustering algorithm is using for example Kmeans or HAC methods to identify correlations in the RSSIE data that are belonging to the same group. The Kmeans algorithm is explained in greater detail herein https://en.wikipedia.org/wiki/K-means clustering, which is incorporated in its entirety by reference. HAC belongs to the hierarchical clustering method and some further description can be found under the following reference https://en.wikipedia.org/wiki/Hierarchical clustering In other words, the clustering step groups the RSSI measurement into different subsets.

In some aspects, the DEC as an unsupervised deep learning network is to be trained. It has been found by the inventors that a deep embedding clustering framework DEC is particularly beneficial for RSSI data from the indoor space, for which the positioning shall be determined. The system is then trained in the already existing environment. In some other aspects, the network can be pre-trained using real or simulated measurements. Some aspects concerns the training itself. As mentioned previously the deep embedded clustering network may include in some aspects an auto encoder and clustering network. For training, the auto encoder is trained together with the clustering algorithm to jointly improve the finding of centroids as well as the encoder weights.

Some other aspects concern the learning and improvement of the positioning itself. As outlined before the method uses a grid structure with one or more anchors, each of the anchors having a positioning parameter set assigned to it. Changes in the indoor space or an increasing number of RSSI information may cause an adjustment of the resolution of the previously defined grid structure. Hence, in some instances, the step of clustering the plurality of RSSI measurement in a plurality of subsets includes identifying a plurality of subsets, wherein the number of subsets differ from the number of the at least two grids. In some instances, a grid with an anchor can be divided into two or four new grids, each of them with an anchor. Initially, the anchor may inherit the positioning parameter set form the previous anchor. On the other hand, the method may include the step of combining two grids with two anchors into a single grid having only one anchor.

In some other instances, grid size is adjustable over time and can vary depending on the amount of measurements. In some instances, the clusters are used as grids, or more particular the cluster borders in real space also form the grid borders.

In some other aspects, the step of clustering the plurality of RSSI measurement includes a pre-selection of a first plurality of RSSI measurement out from the plurality of RSSI measurement based on selection criteria in order to conduct further steps with the first plurality. This aspect may allow to reduce the numbers of RSSI measurements being taken into account for the clustering step or to disregard non-suitable RSSI data. In some aspects, the selection for disregardment is based on time, date or age of the RSSI measurement. Alternatively, the number of received signals from various access point can be taken into account. If the amount of signals is below a defined threshold then the data is disregarded. A similar approach is to use the signal strength, the signal to noise ratio or other criteria.

In another aspect, a dynamic weight value is assigned to RSSI measurement. The weight value is adjusted in response to the age of the RSSI measurement or the time stamp. This allows slowly phasing out older RSSI data or giving them lower value. In case of changing environment, older RSSI data may become obsolete and will be slowly disregarded. The weight value may become smaller over time, for example in a linear manner with a predefined factor. In some other examples, the decrease of the weight value is exponential with a pre-defined factor. The factor is adapted to the environment situation, in often changing environment the factor may be set to a value causing a faster out phasing of RSSI data.

Some other aspects concern that in a changing environment certain access points are no longer visible as its emission becomes attenuated or blocked. In some instances, the step of clustering the RSSI data in feature space is evaluating a correlation between the access point positioning and the grid structure. By doing so, a probability value can be assigned to each access beam point with respect to each anchor of the at least two grids, indicating the failure to receive a signal when being within the specific grid.

Some other aspects concern that under certain circumstances, in certain indoor spaces a larger plurality of RSSI data is available in a certain area. For example, an access point (NFC, ZigBee and the like) could be arranged close to a door, such that the amount of measurement is large and/or the resolution close to such area is finer than somewhere else.

In an aspect, the method may provide a re-evaluation of positioning parameter on a local basis instead of evaluating the positioning parameter sets globally.

Some other aspect relates to a system or an arrangement. The system or arrangement includes a memory and one or more processors. The one or more processors are adapted to execute one or more of the various aspects of the method as disclosed above.

In some aspects, a system includes a memory and one or more processors that are adapted to execute instructions to
- assign an initial vector of positioning parameters to each anchor;
- Capture and store a plurality of RSSI measurements within the defined area by receiving signal from the at least three stationary access beam point;
- Cluster the plurality of RSSI measurement in a plurality of subsets, wherein the number of subsets corresponds to the number of the at least two grids;
- Associate each subset of the plurality of subsets to a respective one of the at least two grids; and
- Update the initial vector assigned to the anchor of the respective one of the at least two grids based on the vector of initial positioning parameters and the subset of the plurality of subsets associated with the respective one of the at least two grids

BRIEF DESCRIPTION OF THE DRAWINGS

In the following, the disclosure is explained in detail with respect to several accompanying drawings, in which.

DETAILED DESCRIPTION

Positioning system using RSSI measurements are generally following two slightly different approaches. The first method calculates the distance from a respective RSSI transmitter. This method is similar to GPS, where several satellites are transmitting signals to a receiver that calculates its positioning using timestamp information in the received signals. In indoor systems, one also needs three transmitters, whose positioning is known. In case of 3D positioning (taking height into account) four known transmitters are required. Algorithms that consider certain path-loss parameters are able to determine the positioning in space out from the received signal strength of the transmitters.

In the above example, the transmitters are active, that is they are sending continuously a beam received by the positioning device. Alternatively, the positioning device can be actively sending beams to receivers, which either mirror the signal or evaluate the signal strength themselves.

The second method is known as fingerprinting. In this approach, a signal vector is generated for predetermined positionings within the space. The term vector or signal vector resembles a set of received signals wherein each signal can be associated with an access beam. The dimension of the vector corresponds to the number of received signals form the different beams. RSSI measurements of the signals from the transmitters are captured for each of the positioning and a respective vector is determined and stored. The result is a vector grid overlaying the space, in which the positioning is to be determined. For positioning determination, a newly determined vector is compared with the stored vectors, and the positioning is based on the stored vector resembling the newly determined vector best. The resolution of this method is defined by the vector grid.

Figure 1:
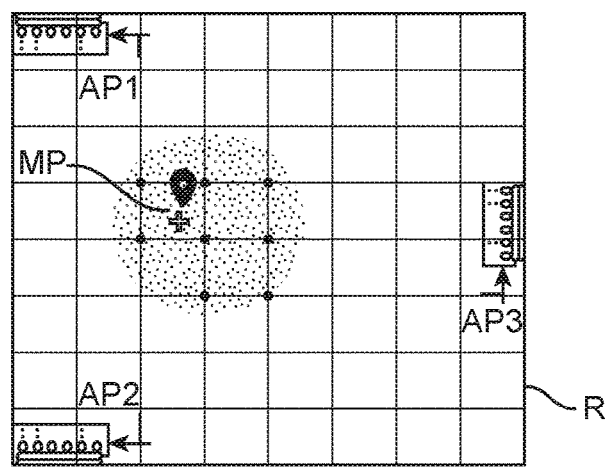
FIG. 1 illustrates an indoor space with a grid structure overlay and some anchors and access points to illustrate various aspects of the present disclosure.

FIG. 1 shows an example of both methods. The figure illustrates an indoor space R which is affected by three transmitters or access points AP1 to AP3. A RSSI measurement MP is taken at the illustrated positioning MP. The positioning can then be determined by evaluating the signal strength of the three different access points AP1 to AP3 if its transmission energy and other parameter are known. For this purpose, a model including defined path-loss parameter is used. One common model evaluates the RSSI as:

$$RSSI = L_0 + \gamma^{NLOS} \log_{10}(d) + S^{NLOS}$$

Further explanation of this model can be found under the following address: https://en.wikipedia.org/wiki/Log-distance_path_loss_model.

Due to noise or unknown or uncertain parameter, the positioning determined using the path-loss model is less precise.

FIG. 1 also shows a grid structure overlaid over the indoor space having several anchor points. The expression anchor or anchor point refers to a dedicated point to which a grid is associated with. In some instances the grid center can be such anchor. Each anchor point is associated with a RSSI vector that has previously been captured. Comparing now the newly measured RSSI with the predetermined vector, one can also obtain the positioning.

In the above example, one can see that the grid can provide a higher resolution than the calculation of the signal loss parameters, in cases in which the Length between two anchors becomes smaller than the average resolution of trileration. However, any change in the setup, by shadowing one of the access point will result in a significant error for the grid measurement.

Several other methods have been proposed to overcome the above mentioned issues both on different method. (i.e. time of flight) attempts to compensate noise, reflection of signal and the like. However, all these methods suffer from various drawbacks and require more effort to achieve a position resolution. Using the above mentioned two approaches have their disadvantages as well, but modern smart phones are already making use of several standards, i.e. ZigBee, Wi-Fi Bluetooth and the like, which can be used to perform RSSI measurements.

The present disclosure now proposes to pair the flexibility and independence of manual picking trilateration with the accuracy of fingerprinting. Instead of storing RSSI measurements on each anchor during the fingerprinting approach disclosed above, the inventors suggest to obtain improved path-loss parameters for each anchor. To obtain such improved path-loss parameter, the inventors suggest starting with initial parameters and capture a plurality of RSSI and positioning measurements. The RSSI raw data can be evaluated into positions using the initial parameters if needed. An unsupervised learning method can then be used to cluster the plurality of measurement and associate each cluster with a respective anchor.

In an ideal world each cluster would probably match the respective anchor, however in real environment there will be an error due to noise, reflections, multipath-loss and the like. The error can be used to improve the initial parameter to obtain an improved path-loss model for each anchor. After some iterations the path-loss parameters for each are such that the error is minimized. In some aspects, the approach makes use of visible anchors only. In some other aspects RSSI measurement will be weighted, that is older measurement will fade away. This approach may reduce the influence of older measurement and can therefore take temporary changes in the environment into account. Hence, the path-loss parameters are not static but dynamic and adapt the changes in the environment. The method is self-learning using the unsupervised method for clustering. In some aspects, the grid structure initial pre-defined can be altered by the clustering method. For instance the cluster numbers can also change, i.e. if certain positioning are no longer accessible or new ones become accessible. By comparing the cluster centers with the current grid structure, the grid structure is adapted. In some aspects the grid structure is made more coarse or finer in response to the amount of clusters and/or RSSI measurements.

Figure 2:
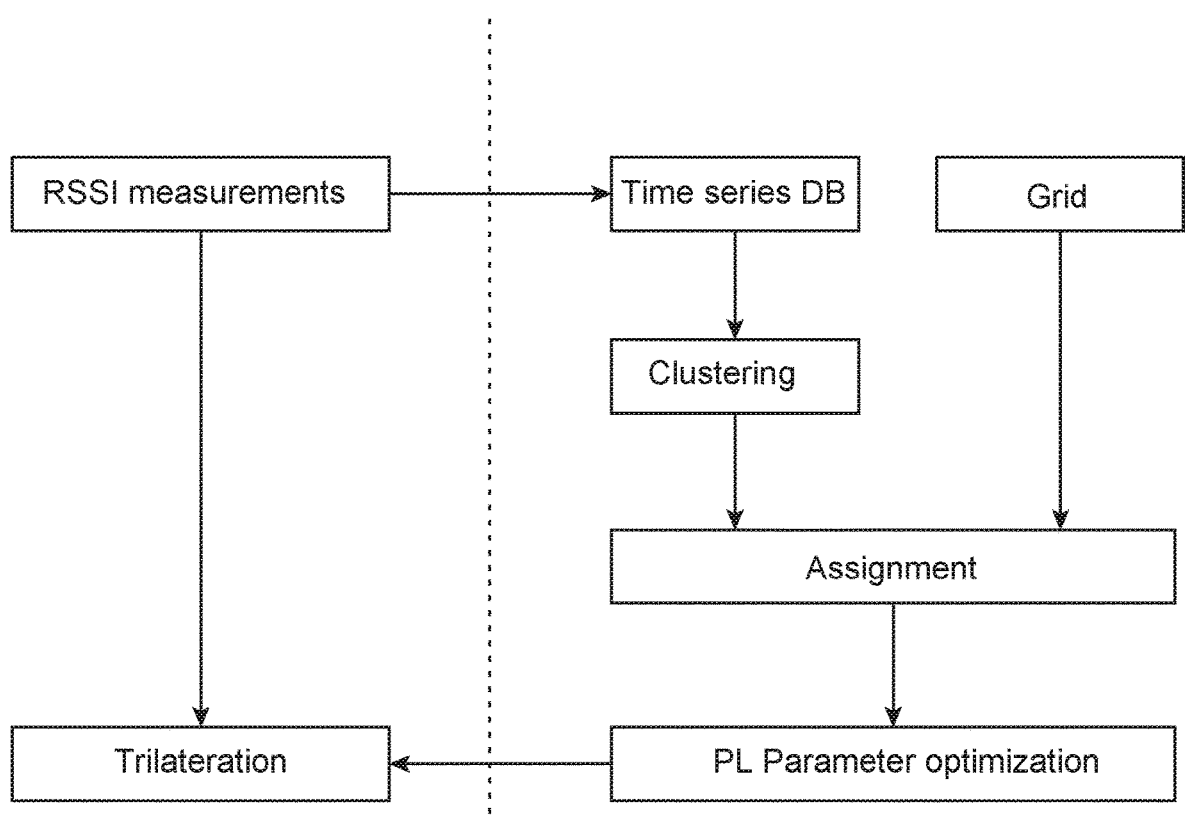
FIG. 2 provides a general overview about the proposed principle.

FIG. 2 shows an overview of the above proposed principle. The approach can be divided into two, an online part and an offline part. The online part is illustrated on the left side showing the RSSI measurement and subsequently the step of Trilateration using path-loss parameters. This part of the proposed principle is known and various methods exists to evaluate the positioning in space based on RSSI measurement. In the initial step, in which no improved path-loss parameters are available, positioning is done using the initial parameters. Each RSSI measurement is also saved offline in a database together with a time stamp marked as "Time series DB" in the offline part on the right side of FIG. 2. Crowdsourcing or other method can be utilized to obtain a plurality i.e. several thousand measurements.

The time stamp offers several different ways of data representation. In some instances each RSSI measurement is taken for itself and independent of any other measurement. Alternatively, the RSSI measurements can be combined using time data observation. For example an average of measurements can be formed over a fixed time window, such that each RSSI result is presented by an average values. Alternatively, all values can be taken over a fixed time value and the flattened or combined in a matrix.

The data representation is then used to cluster the RSSI measurements using unsupervised learning. This step is marked as "Clustering". For this purpose, either the positionings can be clustered or the RSSI measurements itself. In addition, the clustering step can contain pre-processing of the available data including data augmentation and transformation into different feature spaces. Auto encoding with the data may be a preferable option, particularly when the amount of RSSI measurement even with crowd sourcing is rather sparse.

The amount of clusters searched for are predefined and corresponds to the amount of grids and anchors within the indoor space in question. The grid an anchors have been determined previously. The RSSI measurements can be directly implied into the unsupervised learning methods as proposed herein without the need to transform those into positioning data. This will reduce the computational effort. The method also enables augmentation of the RSSI measurement data and auto encoding improving the clustering results.

In the next step, the clusters are associated with the respective anchors within the grid structure, called "Assignment". A Hungarian algorithm can be used for such association, wherein the metric for the algorithm is the difference between the anchor positionings with the calculated cluster centers in the 2D or 3D space, respectively. Particularly, using the RSSI measurements and the path-loss parameter, the positionings of each cluster center (or measurement) are determined and then compared with the positioning of the anchoring points. If the clusters are transformed previously into a different feature space, retracing is required to re-transform the features of the cluster back to their respective RSSI representation.

After each cluster is associated with the respective anchor point, the error can be determined. The path-loss parameters for each anchor are then updated, such that improved path-loss parameters are derived. These improved path-loss parameters are forwarded for future online positioning evaluation.

The clustering and assignment using unsupervised methods is beneficial when the indoor environment is unknown or changing over time. For example in a retail store rearrangement of shelves placement of certain obstacles thus changing walking path for customers. Another example would be rearrangement of access points/transmitters. While in conventional fingerprinting method and new calibration is necessary, the unsupervised learning method can adapt to these new environments by revising the path-loss parameters. Hence, it is a self-learning method, which does not need an initial and fully established grid, but can start from global initial path-loss parameters (i.e. representing one global anchor). In such approach, the number of clusters initially corresponding to the number of anchors can be adapted and increase for example when the clustering step clearly results in two or more centers. Likewise, the number of anchors and grids can be reduced by for example combining to adjacent grids into one single grid.

Some other aspects concern the handling and weighting of measurements when determining the clusters and associating those with the anchors. A time based weight can be assigned to each RSSI measurement, such that older RSSI measurement are slowly faded out and no longer taken into account for more recent iterations.

Even further, the proposed unsupervised learning method does not require a certain number of RSSI measurements, but can continuously improve the parameter. As more measurements are becoming available using crowd sourcing methods, the clustering can be used to gradually reduce the grid size. As a result, the grid resolution increases.

Figure 3:
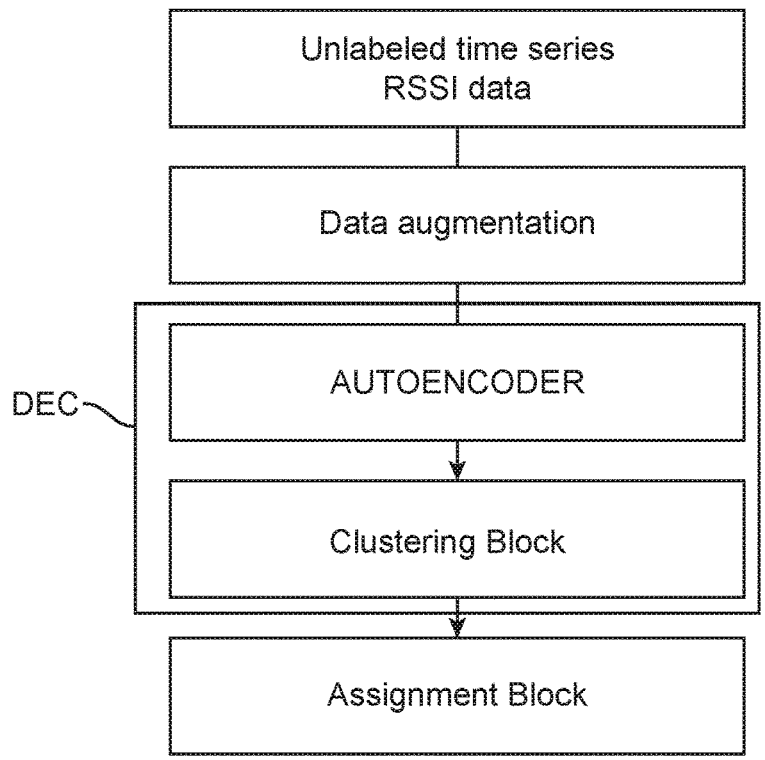
FIG. 3 shows a more detailed view of some method steps in accordance with the proposed principle.

FIG. 3 shows some steps of the offline part in greater detail. The unsupervised learning method focuses particularly on steps marked as "Autoencoder" and "Clustering Block" using a deep embedding clustering Framework DEC. The general principle to utilize a DEC framework is to transform data with nonlinear mapping using an auto encoder and then subsequently identify the clusters in the new space due to the easier approach than in the original space. Once identified in the new feature space, they can be re-transformed back and assigned to the anchors using the Hungarian algorithm for example.

Figure 4:
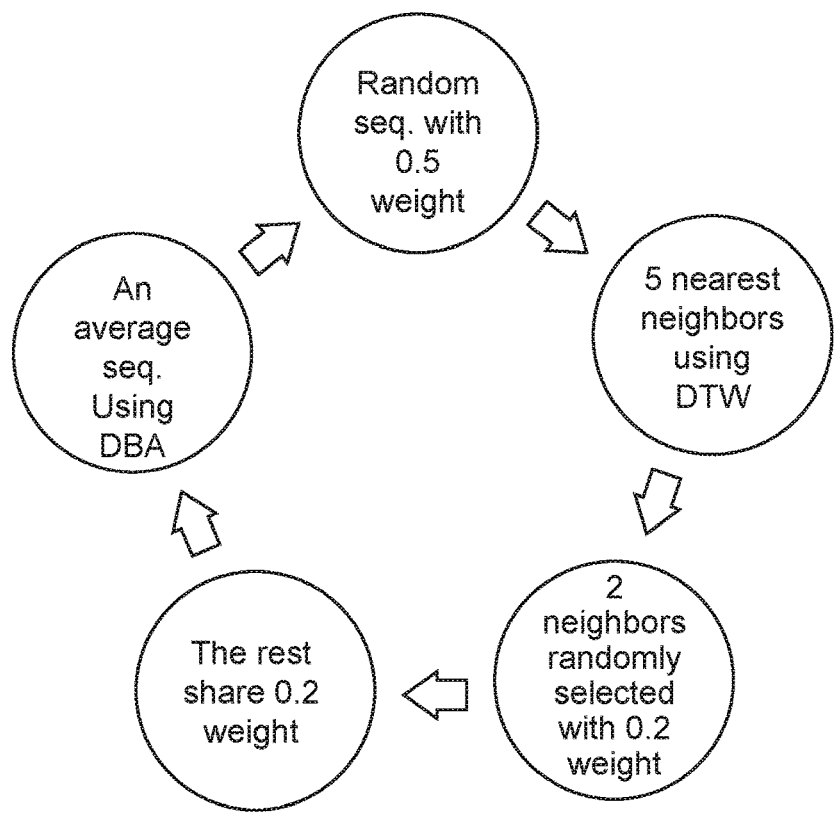
FIG. 4 illustrate shows an example of a method for data augmentation used in some aspects of the proposed principle.
Figure 5:
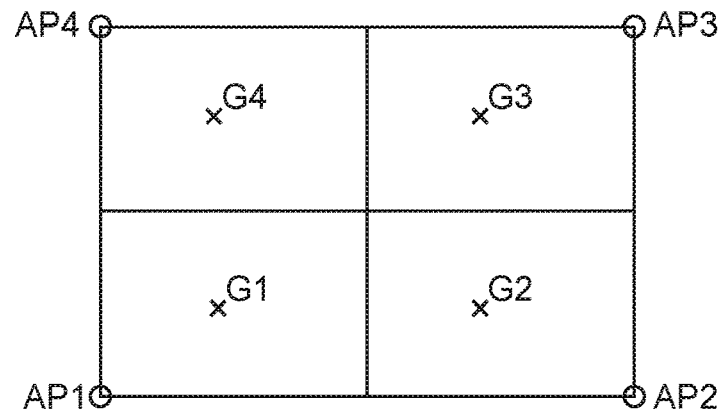
FIGS. 5 to 8 show various steps for determining path-loss parameter sets in an indoor space according to some aspects of the proposed principle.

In this example, the unlabeled time series of RSSI data are fed into a data augmentation model that augments the available information two times. FIG. 4 illustrates an exemplary workflow of such data augmentation. The workflow includes 5 consecutively executed steps starting with a random sequence assigned with 0.5 weight to it. Dynamic time warping (DTW) alignment is used to find a similarity metric between two temporal sequences to identify the 5 nearest neighbors. DTW exploits the time distortions between the two temporal sequences, wherein the term "similarity" corresponds to an optimal match calculated following a sum of rules and minimizing a cost given by the sum of absolute distances between values of matched indices. The method then continues with selecting two neighbours randomly and assigning a fixed weight to the with the rest sharing the same weight of 0.2. Finally, an average sequence using a Dynamic Time Warping Barycenter Averaging step is used.

Referring back to FIG. 3, after the data is augmented, it is forwarded to the DEC and particularly into the auto encoder being the core of the DEC. An auto encoder is a type of artificial neural network used to learn efficient data coding in an unsupervised manner. The aim of an auto encoder is to learn a representation (encoding) for a set of data, typically for dimensionality reduction, by training the network to ignore signal "noise." The reduction is useful in cases of high number of access points. Larger number of access points increase the RSSI vector (the dimension of a single RSSI data set having multiple received signals from the access points in reach), although some components of such vectors may be zero (a zero component mean that no signal from that access beam has been detected). Data encoding will reduce the dimensions and thereby reduce the computational effort.

Along with the reduction side, a reconstructing side is trained, where the auto encoder tries to generate from the reduced encoding a representation as close as possible to its original input. For evaluating the error during the auto encoder step, i.e. the difference between the input data and the encoded output data a mean square error loss function is used. Auto encoding provided the best result with an Adam optimizer. The encoded representation of the RSSI input data are fed into the clustering block of the DEC that uses Kmeans of HAC algorithm to associate the encoded data into with the clusters.

FIGS. 5 to 8 illustrate an exemplary flow of the various method steps in an indoor space environment. The indoor space environment according to FIG. 5 includes four access point AP1 to AP4 arrange in the corners of the environment. Each access point transmits a respective signal into the environment. For simplicity, the environment is rectangular. A grid structure is overlaid over the environment dividing the space into four substantially equally sized grid areas. This structure may be the initial structure. Each grid area has a centrally arranged anchor G1 to G4. In the initial step, no individual path-loss parameter are known for the respective grid anchors C1 to G4. Therefore, an initial path-loss parameter set PL0 has been assigned to each anchor.

Figure 6:
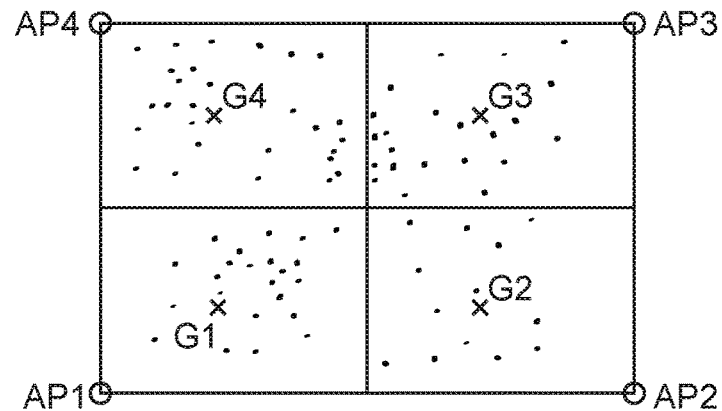

FIG. 6 illustrates the situation for the indoor space environment after a certain period. A plurality of RSSI and positioning information have been collected. Each of those positionings has been determined by measuring the signal strength of all four access points and calculate the positioning using the initial parameter set PL0. Hence, the RSSI measurement can be quite different and do not need in any way to reflect the determined positioning. The RSSI measurements are continued and the amount of data will further increase over time. Although not shown here, each RSSI measurement also contains a time stamp and maybe additional meta-information. In some instances, data is collected fully anonymously. This will allow using crowdsourcing of data.

Figure 7:
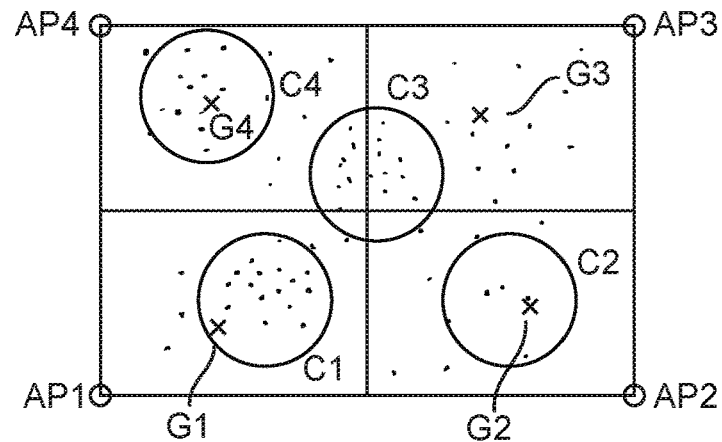

FIG. 7 illustrates a representation of the result of the clustering step in a 2D space. The plurality of RSSI measurements are fed into a trained auto encoder to reduce its dimension and transform the RSSI data into a different space. In that new space (which is multi-dimensional), the data is clustered into four different clusters C1 to C4 corresponding to the number of anchors in the grid. The clusters are not assigned to the respective anchors yet, but it already becomes apparent that the clusters in real space substantially correspond to the grids.

As one can see, some of the RSSI measurements/positionings are not used. This is due to their respective time stamp, they might be too old or lack of signal strength. For example, some of the RSSI measurements might be too noise or might have not received signals from all access points.

Figure 8:
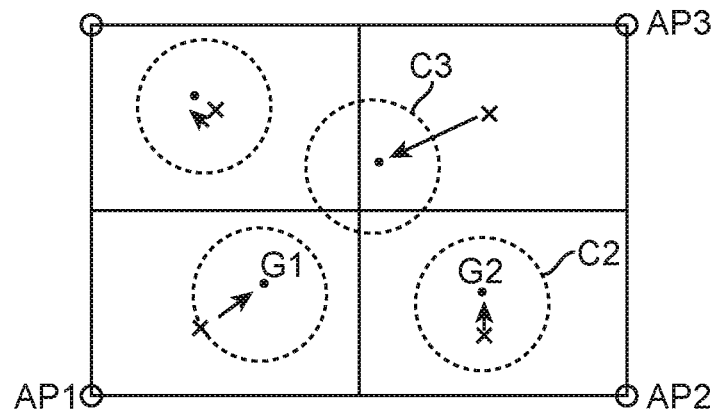

FIG. 8 illustrates the next steps. After clustering and determining the centre of each cluster, the clusters are assigned in the real indoor environment (not in the feature space) to the anchor points using the Hungarian algorithm or any other suitable method. In particular, cluster C1 is associated with anchor G1 and cluster C2 is associated with anchor G2. Both cluster centres are close to their respective anchors and their association seems reasonable. Concerning cluster C4, the algorithm associates this cluster with anchor G4. Cluster C3 seems somewhat in the middle between anchor G3 and G4, but it is associated finally with anchor G3, because the error with such anchor is smaller than with anchor G4. Hence, in this example the algorithm may calculate the error between each cluster with the respective anchors and subsequently minimizes the error between each association and the overall error. As a result, cluster C3 is associated with cluster G3.

After association, the deviation from the defined anchor is used to update the path-loss parameter set for each anchor. For this, the path-loss parameters are adjusted that the centre of the cluster matches the positioning of the anchor.

The above-mentioned method is then repeated with new and revised RSSI measurements to achieve a further improvement. Such a dynamic update and improvement of the path-loss parameter is achieved increasing the resolution and making it more robust against noise or slow variations in the environment (i.e. temperature humidity, occupancy by people and the like).

Figure 9:
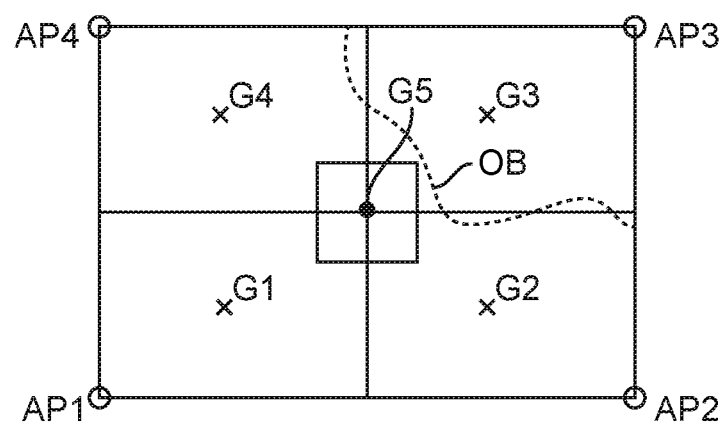
FIG. 9 illustrate an example or adjusting the grid structure in response to clustering results and changes in the environment.

A further example is given in FIG. 9. In some instances, the system may use the clustering to improve or adjust the grid structure. As in the previous example, cluster C3 can be set as a new cluster adjusting the grid and providing an additional anchor G5. The unsupervised learning network is used in this example to identify new clusters and adjusting the grid to a finer resolution. Changes in the environment, for example a temporary obstacle indicated by line OB, may also render grid associated with anchor G3 inaccessible. Hence, no more the RSSI measurements in that grid will be made and the measurements already taken will become outdated. The unsupervised learning method will realize such aspect and can remove anchor G3 from the mapping, or replace anchor G3 with new anchor G5.

Figure 10:
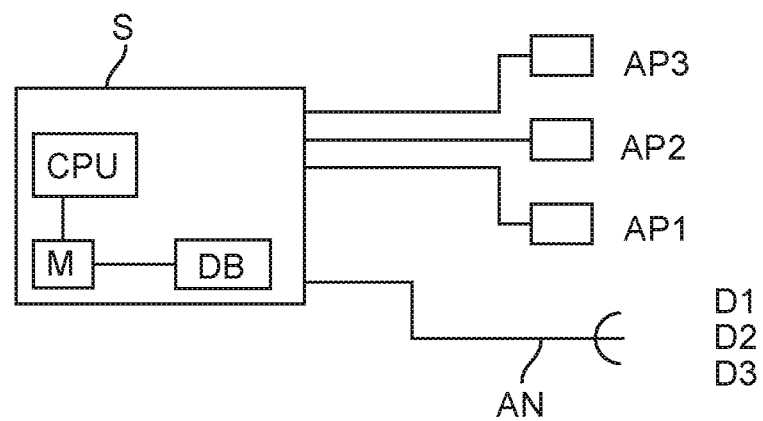
FIG. 10 show a system able to perform various aspects of the proposed principle.

FIG. 10 shows an exemplary system enabled to perform the method and to provide positioning parameters in an indoor environment. The system utilizes the unsupervised learning method to generate a grid structure with associated anchors. Path-loss parameters are assigned to each anchor and subsequently improved using the above approach. The system S includes a memory, operating system and the like as well as one or more processors CPU. A storage contains a database DB for the RSSI measurement and all other data, and is connected to memory M. The system is coupled to an antenna AN for receiving RSSI measurement from a plurality of mobile devices D1 to D3. Each device may transmit RSSI measurement in relation to a dedicated positioning using one or more communication standards to the antenna. Some standards provide an evaluation of RSSI measurement and feedback thereof. In some instances, the system can be part of an indoor communication system, based on Wi-Fi, ZigBee, Bluetooth or parts of the new 5G standard. The system may also include an optional connection one or more access points AP1 to AP3 that are stationary located within the indoor space. In some aspects, the devices may capture a respective signal not from each access but only from some of the access points. The system and method may consider such occurrence when generating the grid structure.

In accordance with the present disclosure, the one or more processors CPU of the system are adapted to execute the above method step and in particular, the steps illustrated in FIG. 2 to FIG. 4. The processors may be particularly suited for unsupervised learning method and or auto encoders. In some instance, some of the processors can be CPU's and the like, which are suited for AI learning. The system collects via antenna a plurality of RSSI measurements transmitted by devices D1 to D3 in operation and stores them in the database together with certain me information like timestamp and the like. The plurality of measurement are then copied into the memory and processed in accordance with previously disclosed steps. The system may apply various data augmentation, encoding and clustering steps to obtain one or more clusters within the space. These clusters are used to improve the currently existing anchors in a grid structure or to change the existing grid structure by defining new anchors or delete obsolete anchors no longer relevant. Depending on the measurement rate, the resolution of the grid structure can be increased leading to more anchors with improved path-loss parameters for each set. The path-loss parameters can be retransmitted back to the devices D1 to D3 for later use in an indoor positioning system.

In some embodiments, the system uses the timestamp information to phase out older measurements or assign to those a lower weight when evaluating the clusters.

Figure 11:
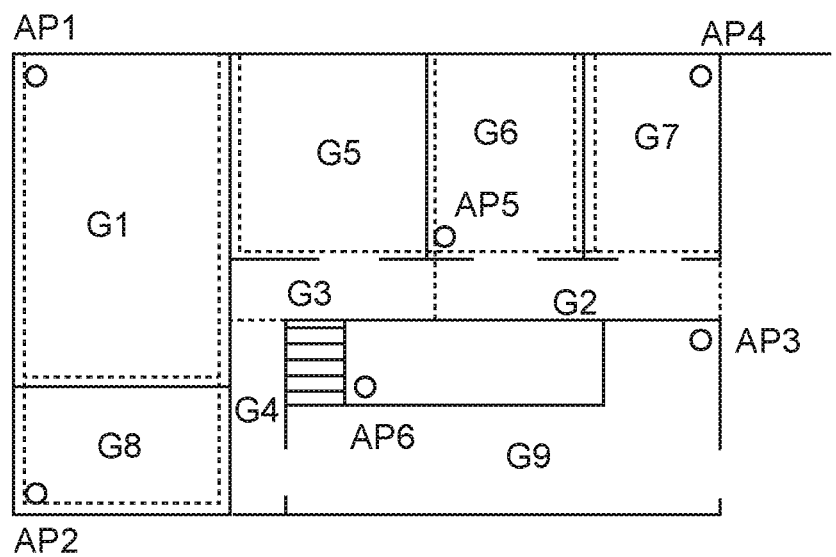
FIG. 11 illustrates a more realistic example of an indoor space environment with a dynamic grid structure defined for a positioning system.

Finally, FIG. 11 illustrates a more realistic example of an indoor space environment with a dynamic grid structure defined for a positioning system. The space is an office area having six access points AP1 to AP6 and a grid structure with 9 different portions. The portions have different size and are located in different areas within the office space. For instance, a long corridor contains grid portions G2 to G4, which grid portion C1 overlays the entry area. The remaining grid portions are associated with individual rooms in this initial step. As some area within the individual rooms are occupied (i.e. board, desk and the like), future iterations may be able to reflect this. Consequently, the proposed method and system is able to identify such occupied areas in future iterations and increase the resolution of the grid.

In this more realistic example of an indoor space, it may also occur that during initial fingerprinting it is apparent that not all access point are visible to a device from each positioning. Hence, this aspect can be stored as well and considered during the initial fingerprinting and the learning process. For example, access point AP6 may be invisible when being in grid. G4. Hence, an RSSI measurement with a signal portion coming from access point 126 can rule out being in grid G4. Path-loss parameters in grid. G4 are evaluated without access point AP6.

The latter aspect may also be used to increase robustness. For each RSSI measurement data, point the signal strength of all visible access beam points is captured and stored, in the present example as vector with six components, each component representing an individual RSSI measurement. During the data pre-processing i.e. augmentation and clustering step, only some components are evaluated. While this may increase the noise compared to considering the full vector, it also allows comparing the results with a re-evaluation using the remaining components. Permutation is possible using various components for each iteration or also for the actual positioning of a device rendering the method more robust against fast varying changed in the signal strength of individual access points (i.e. by a temporary blocking or attenuation).

The present disclosure offers a solution that combines two commonly used techniques for positioning. It takes the benefit for both approaches and compensates its weakness using unsupervised learning to continuously improve or adapt the parameters utilized to derive the positioning from an RSSI measurement. The supervised learning method enables the present disclosure to lean and create a grid structure similar to the known fingerprinting from scratch. In contrast to the conventional method, the inflexibility of the fingerprinting approach to adapt to changes in the environment is overcome by the unsupervised learning. The learning allows adapting the resolution of the grid to the needs is robust to slow changes by adapting to it and offers the determination of more robust path-loss parameters.

LIST OF REFERENCES

AP1, AP2, . . . AP4 access points
A anchors
R indoor space
C1, C2, . . . C4 clusters
G1, G2, . . . G4 grid anchors
PL0 initial path-loss parameter set
AN antenna
S system
M memory
DB storage
D1, D2, D3 mobile devices

The invention claimed is:

1. Method for evaluating positioning parameters in a defined space, particularly in an indoor space, wherein the defined space is affected by at least three stationary access beam points and over which a grid pattern is laid with at least two grids, each grid having an anchor, the method characterized by the steps of:
    assigning an initial vector of positioning parameters to each anchor;
    capturing and storing a plurality of Received Signal Strength Indicator (RSSI) measurements within the defined area by receiving signals from the at least three stationary access beam points;
    clustering the plurality of RSSI measurements in a plurality of subsets, particularly wherein the number of subsets corresponds to the number of the at least two grids;
    associating each subset of the plurality of subsets to a respective one of the at least two grids; and
    updating the initial vector assigned to the anchor of the respective one of the at least two grids based on the vector of initial positioning parameters and the subset of the plurality of subsets associated with the respective one of the at least two grids.

2. The method according to claim 1, wherein the vector of initial positioning parameters comprises path-loss parameters.

3. The method according to claim 1, further comprising at least one of:
    forwarding the updated vector for at least a subset of anchors of the at least two grids to one or more mobile devices for positioning; and/or
    determining the positioning based on a respective RSSI measurement and the updated vector of positioning parameters.

4. The method according to claim 1, wherein the step of capturing and storing a plurality of RSSI measurements comprises at least one of:
    providing a time stamp for each captured RSSI measurement; and/or
    determining the positioning using the RSSI measurement and the initial vector of positioning parameters.

5. The method according to claim 1, wherein the step of clustering the plurality of RSSI measurement in a plurality of subsets comprises at least one of:
    augmenting the plurality of RSSI measurements including a dynamic time warping (DTW) approach using a plurality of neighbouring RSSI measurements to a selected RSSI measurement;
    auto encoding the RSSI measurements to create an encoded representation and feeding the encoded information into the clustering algorithm; and
    clustering the plurality of RSSI measurement in a plurality of subsets using Kmeans or HAC algorithms.

6. The method of claim 5, wherein the auto encoder is trained together with the clustering algorithm to jointly improve centroids and encoder weights.

7. The method according to claim 1, wherein the step of clustering the plurality of RSSI measurement in a plurality of subsets comprises identifying a plurality of subsets, wherein the number of subsets differs from the number of the at least two grids.

8. The method according to claim 1, wherein the step of clustering the plurality of RSSI measurement comprises:
    pre-selecting a first plurality of RSSI measurement out from the plurality of RSSI measurement based on selection criteria in order to conduct further steps with the first plurality, wherein the selection criteria comprises at least one of:
time, date or age of the respective RSSI measurement;
number of received signals from various access points; and/or
signal strength of one or more access points.

9. The method according to claim 1, wherein the step of clustering the plurality of RSSI measurement comprises: assigning a weight parameter to each RSSI measurement based on the time the RSSI was taken or the age of the RSSI measurement, such that the weight becomes smaller the older the RSSI measurement becomes.

10. The method according to claim 1, wherein the step of capturing and storing a plurality of RSSI measurements comprises storing the received signal strength from the received signals of the at least three stationary access beam points as components of one RSSI measurement and the subsequent step of clustering comprises utilizing some components of the one RSSI measurement for clustering in a plurality of subsets.

11. The method according to claim 10, wherein the components are permutated between subsequent iterations of the method.

12. A non-transitory computer readable medium that contains instructions that when executed in a computer having a memory and one or more processors causes the one or more processors to:
assign an initial vector of positioning parameters to each anchor;
capture and store a plurality of RSSI measurements within the defined area by receiving signals from the at least three stationary access beam points;
cluster the plurality of RSSI measurements in a plurality of subsets, particularly wherein the number of subsets corresponds to the number of the at least two grids;
associate each subset of the plurality of subsets to a respective one of the at least two grids; and
update the initial vector assigned to the anchor of the respective one of the at least two grids based on the vector of initial positioning parameters and the subset of the plurality of subsets associated with the respective one of the at least two grids.

13. System for evaluating positioning parameters in a defined space, particularly in an indoor space, wherein the defined space is affected by at least three stationary access beam points and over which a grid pattern is laid with at least two grids, each grid having an anchor, and wherein the system comprises
a memory;
one or more processors, the one or more processors adapted to execute one or more instructions that:
assign an initial vector of positioning parameters to each anchor;
capture and storing a plurality of RSSI measurements within the defined area by receiving signal from the at least three stationary access beam point;
cluster the plurality of RSSI measurement in a plurality of subsets, wherein the number of subsets corresponds to the number of the at least two grids;
assign each subset of the plurality of subsets to a respective one of the at least two grids; and
update the initial vector assigned to the anchor of the respective one of the at least two grids based on the vector of initial positioning parameters and the subset of the plurality of subsets associated with the respective one of the at least two grids.

14. The system according to claim 13, the one or more processors are adapted to execute one or more instructions that at least:
forward the updated vector for at least a subset of anchors of the at least to grids to one or more mobile devices for positioning; and/or
determine the positioning based on a respective RSSI measurement and the updated vector of positioning parameters.

15. The system according to claim 13, wherein the one or more processors are adapted to execute one or more instructions that at least one of:
augment the plurality of RSSI measurements including a dynamic time warping (DTW) approach using a plurality of neighbouring RSSI measurements to a selected RSSI measurement;
auto encode the RSSI measurements to create an encoded representation; and feed the encoded information into the clustering algorithm; and
cluster the plurality of RSSI measurement in a plurality of subsets using Kmeans or HAC algorithms.

* * * * *